United States Patent [19]
Schennum et al.

[11] Patent Number: 5,842,504
[45] Date of Patent: Dec. 1, 1998

[54] SAFETY VALVE FOR AN INVERTED LIQUID-FILLED CANISTER

[75] Inventors: Steven M. Schennum, West Chester; Christopher M. Miller, Milford, both of Ohio

[73] Assignee: The Procter & Gamble Company, Cincinnati, Ohio

[21] Appl. No.: 756,616

[22] Filed: Nov. 26, 1996

[51] Int. Cl.[6] .................................................. F16K 15/00
[52] U.S. Cl. ................ 137/540; 137/540.11; 137/543.21
[58] Field of Search ........................... 137/540, 540.11, 137/543.21, 119.09, 850; 251/345

[56] References Cited

U.S. PATENT DOCUMENTS

| | | | |
|---|---|---|---|
| 2,071,391 | 2/1937 | Crowell | 137/540 |
| 2,759,699 | 8/1956 | Rush | 251/62 |
| 2,930,401 | 3/1960 | Cowan | 137/543.21 |
| 3,145,724 | 8/1964 | Pelzer | 137/543.21 |
| 3,255,774 | 6/1966 | Gallagher et al. | 137/540 |
| 3,610,268 | 10/1971 | Arutunoff | 137/119.09 |
| 3,756,273 | 9/1973 | Hengesbach | 137/540 |
| 4,386,718 | 6/1983 | Stewart et al. | 137/850 |
| 4,632,362 | 12/1986 | Lucking | 251/345 |
| 4,782,895 | 11/1988 | Jacob et al. . | |
| 4,889,184 | 12/1989 | Lugtmeier et al. . | |
| 5,209,261 | 5/1993 | Cakmaz et al. . | |
| 5,228,473 | 7/1993 | Zink . | |
| 5,445,224 | 8/1995 | Comeaux . | |

FOREIGN PATENT DOCUMENTS

| | | |
|---|---|---|
| 2559872 | 8/1985 | France ............................. 137/543.21 |
| 55068 C | 2/1891 | Germany . |
| 1351401 | 5/1974 | United Kingdom . |
| 2202137 | 9/1988 | United Kingdom . |
| 2232075 | 12/1990 | United Kingdom . |

*Primary Examiner*—Denise L. Ferensic
*Assistant Examiner*—John Ball
*Attorney, Agent, or Firm*—Elizabeth M. Koch

[57] ABSTRACT

A safety valve for retaining liquid in an inverted, liquid-filled canister inserted within a receptacle having an outlet, includes a valve having a base and a head, a retainer attached to the receptacle, the retainer having a compartment for receiving the valve base and at least one passage for allowing the liquid to flow through at least one passage when the valve is disengaged, and a spring positioned within the compartment, telescopically engaging the valve base, for providing a sealing force on the valve, wherein the valve head engages the outlet of the receptacle for retaining the liquid within the canister when the spring force exceeds the hydrostatic force of the liquid within the canister and the weight of the valve.

7 Claims, 2 Drawing Sheets

SAFETY VALVE FOR AN INVERTED LIQUID-FILLED CANISTER

FIELD OF THE INVENTION

This invention relates to the field of safety valves, and more particularly, to a safety valve for an inverted liquid-filled canister which resists the hydrostatic force of the liquid and the weight of the valve which seals the liquid within the canister.

BACKGROUND OF THE INVENTION

Recently, cleaning implements, such as mops, have been developed which utilize a canister attached to a liquid delivery system containing a sprayer nozzle to dispense cleaning fluid in the vicinity of a disposable pad attached to a cleaning head member. These devices typically use a removable canister which is inserted in an inverted orientation within a receptacle attached to the device's handle. However, these canister and receptacle systems have numerous problems. For example, these canister's typically leak after loading, particularly during storage. Depending on the amount of leakage, the canister will either partially or fully dispense the liquid outside of the liquid delivery system. To prevent leakage, the canister must be removed after each usage of the cleaning implement and stored in an upright position. For at least these reasons, current canister liquid delivery systems are inefficient and inconvenient.

Therefore, what is needed is a non-leaking safety valve for an inverted liquid-filled canister for use in a liquid delivery system.

SUMMARY OF THE INVENTION

Accordingly, it is an object of the present invention to provide an improved non-leaking safety valve for an inverted liquid-filled canister.

It is a further object of the present invention to provide a safety valve for retaining liquid in an inverted, liquid-filled canister inserted within a receptacle having an outlet, comprises a valve having a base and a head, a retainer attached to the receptacle, the retainer having a compartment for receiving the valve base and at least one passage for allowing the liquid to flow through at least one passage when the valve is disengaged, and a spring positioned within the compartment, telescopically engaging the valve base, for providing a sealing force on the valve, wherein the valve head engages the outlet of the receptacle for retaining the liquid within the canister when the spring force exceeds the hydrostatic force of the liquid within the canister and the weight of the valve.

DETAILED DESCRIPTION OF THE INVENTION

Figure 1:
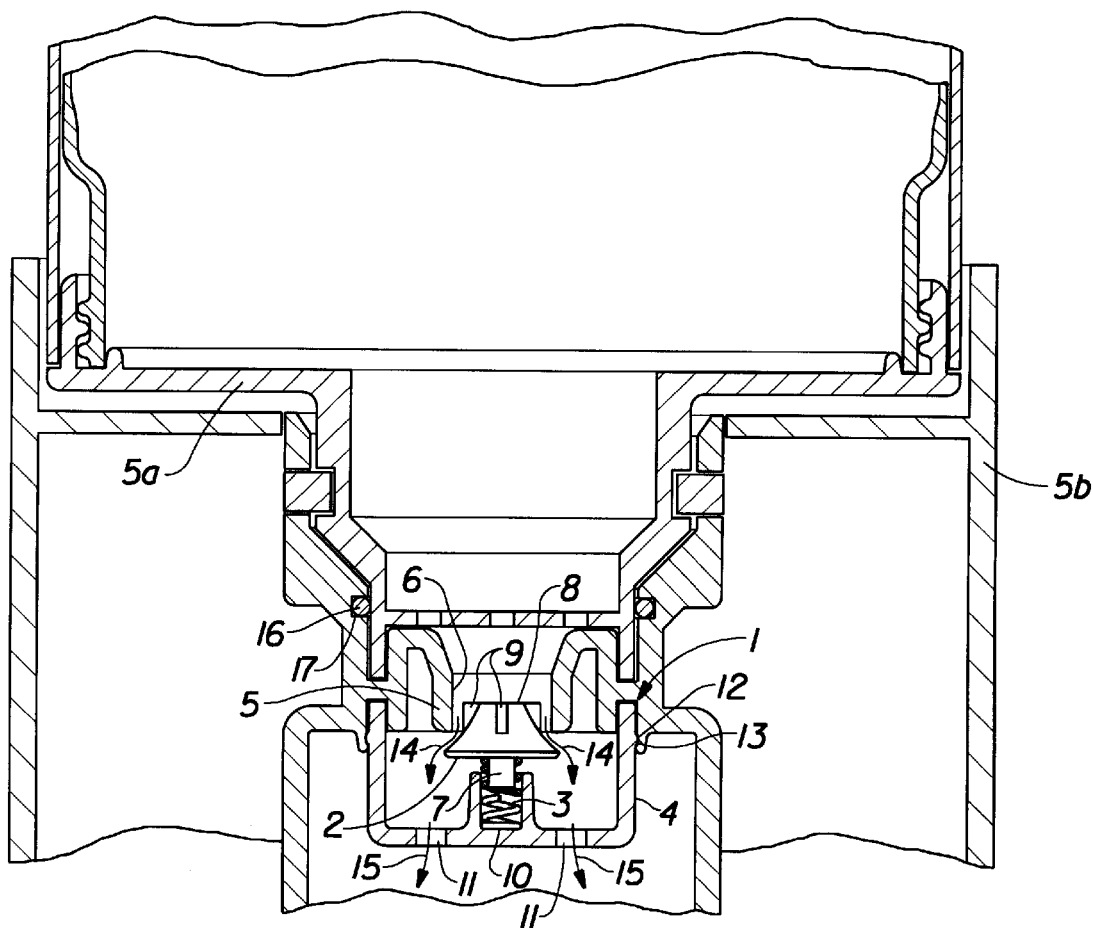
FIG. 1 is a cross sectional view of the preferred safety valve according to the preferred embodiment of the present invention.
Figure 2:
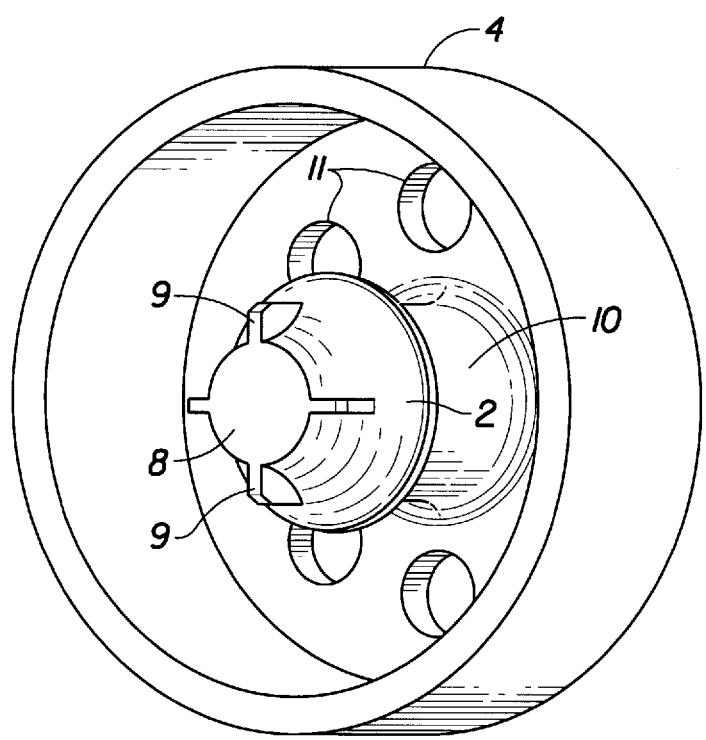
FIG. 2 is a perspective view of the preferred safety valve according to the preferred embodiment of the present invention

Referring to FIGS. 1 and 2, the preferred safety valve 1 has a valve 2, a spring 3 and a retainer 4 which is attached to a receptacle 5 for retaining the liquid within a liquid-filled, inverted canister 5a removably inserted within the receptacle 5 which is positioned within a housing 5b. The receptacle 5 is preferably attached to a liquid delivery system (not shown) and releases the liquid through an outlet 6 to the liquid delivery system. In FIG. 1, the canister 5a is shown in the inverted position.

The valve 2 has a valve base 7 and valve head 8 which preferably has four centering fins 9 for proper alignment of the valve head 8 within the outlet 6 of the receptacle 5. The valve head is preferably chamfered for providing maximum contact with the outlet 6 of the receptacle 5.

The retainer 4 has a compartment 10 for receiving the spring 3 and at least one passage 11 for allowing the liquid to flow from the outlet 6 to the liquid delivery system when the valve 2 is disengaged, preferably by creating a suction on the valve 2 and compressing the spring 3. The retainer 4 is preferably attached to the receptacle 5 using a snap fit by engaging the protrusion 12 of the retainer 4 within groove 13 of the receptacle 5.

The spring 3 telescopically engages the valve base 7 and applies a sealing force on the valve 2 which is greater than the hydrostatic force of the liquid within the canister 5a and the weight of the valve 2 combined. In this way, the valve 2 prevents the passage of liquid through the outlet 6 when the system is at rest.

In operation, the retainer 4 is attached to the receptacle 5 using the snap fit. The force of the spring 3 will cause the valve head 8 to engage the outlet 6. The centering fins 9 will guide the valve head 8 into proper alignment with the outlet 6. At rest, the valve head 8 provides a circumferential seal due to the force of the spring 3 which is greater than the hydrostatic force of the liquid within the inverted canister 5a and the weight of the valve 2.

In use, a pumping mechanism (not shown) creates a pressure increase within the canister 5a, relative to the pressure of the liquid in the liquid delivery system, due to suction. The spring 3 will become compressed, disengaging the seal created by the valve head 8, when the force due to suction, the hydrostatic head of the fluid in the liquid filled canister 5a and the weight of the valve 2 exceeds the force of the spring 3. Upon compression of the spring 3 and release of the valve head 8 seal, the liquid will flow along a path 14 from the canister 5a, into the receptacle 5, through the outlet 6, past the valve head 8 and into the retainer 4. The liquid will then flow along a path 15 through the passages 11 to the liquid delivery system. When the pressure differential between the liquid within the canister 5a and the liquid delivery system is eliminated, the valve 2 will again provide a circumferential seal within the outlet 6 and prevent undesirable leaking. A O-ring 16 is positioned within a cavity 17 of the receptacle 5 to prevent leakage between the receptacle 5 and the liquid-filled canister 5a.

While the embodiment of the invention shown and described is fully capable of achieving the results desired, it is to be understood that this embodiment has been shown and described for purposes of illustration only and not for purposes of limitation. Other variations in the form and details that occur to those skilled in the art and which are within the spirit and scope of the invention are not specifically addressed. Therefore, the invention is limited only by the appended claims.

What is claimed is:

1. A safety valve for retaining liquid, comprising:

an inverted canister inserted within a receptacle having an outlet;

a valve having a base and a head;

a retainer attached to said receptacle, said retainer having a compartment for receiving said valve base and at least one passage for allowing the liquid to flow through said at least one passage when said valve is disengaged; and a spring positioned within said compartment, telescopically engaging said valve base, for providing a sealing force on said valve, wherein said valve head engages said outlet of said receptacle for retaining the liquid within said inverted canister when said spring force exceeds the hydrostatic force of the liquid within said canister and the weight of said valve and for automatically releasing the liquid within said inverted canister when the hydrostatic force of the liquid within said canister and the weight of said valve exceed said spring force.

2. The safety valve of claim 1, wherein said valve head includes at least two centering fins for aligning said valve head within the outlet.

3. The safety valve of claim 1, wherein said retainer has a protrusion which is snapped into a groove of said receptacle.

4. The safety valve of claim 1, wherein said valve head is chamfered.

5. The safety valve of claim 1, further comprising an O-ring positioned between said receptacle and the canister.

6. The safety valve of claim 1, wherein said O-ring is positioned within a cavity of said receptacle.

7. The safety valve of claim 1, wherein said valve head is flexible.

* * * * *